Nov. 14, 1961  G. W. STANTON ET AL  3,008,918
COMPOSITIONS COMPRISING GRAFT COPOLYMERS OF CERTAIN SULFONATED
ACRYLATE AND ACRYLOYL TAURINE TYPE MONOMERS ON
ACRYLONITRILE POLYMER SUBSTRATES
Filed Jan. 29, 1958

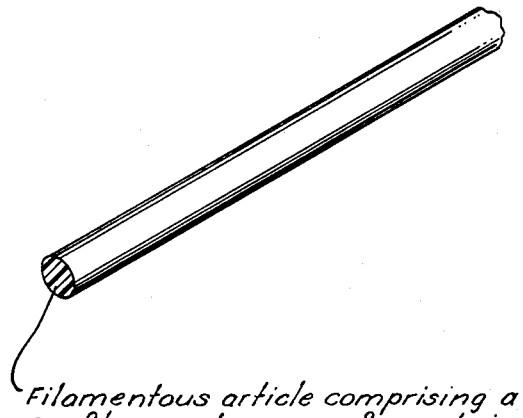

Filamentous article comprising a
graft copolymer of certain
sulfonated acrylate and acryloyl
taurine type monomers on an
acrylonitrile polymer substrate.

INVENTORS.
George W. Stanton
BY Teddy G. Traylor

Griswold & Burdick
ATTORNEYS

United States Patent Office 3,008,918
Patented Nov. 14, 1961

3,008,918
COMPOSITIONS COMPRISING GRAFT COPOLYMERS OF CERTAIN SULFONATED ACRYLATE AND ACRYLOYL TAURINE TYPE MONOMERS ON ACRYLONITRILE POLYMER SUBSTRATES
George W. Stanton, Walnut Creek, and Teddy G. Traylor, Concord, Calif., assignors to The Dow Chemical Company, Midland, Mich., a corporation of Delaware
Filed Jan. 29, 1958, Ser. No. 711,932
10 Claims. (Cl. 260—45.5)

The present invention lies generally in the field of organic chemistry and contributes in particular to the art which pertains to synthetic, fiber-forming high polymers. More particularly, the present invention has reference to the provision of certain readily-dyeable graft or block-type copolymers that are comprised of certain sulfonated acrylate or acryloyl taurine type monomers, or both, polymerized on acrylonitrile polymer substrates.

Hydrophobic polymeric materials of varying origin are commonly employed in the manufacture of various synthetic shaped articles including films, ribbons, fibers, filaments, yarns, threads and the like and related structures, which hereinafter will be illustrated with particular reference to fibers. Polymers and copolymers of acrylonitrile which contain in the polymer molecule at least about 80 percent by weight of combined acrylonitrile units may be utilized with great advantage for such purposes. Difficulty is often encountered, however, in suitably dyeing synthetic hydrophobic fibers and the like that have been prepared from acrylonitrile polymers, especially those that are comprised essentially of polyacrylonitrile. This is especially so when it is attempted to obtain relatively deeper shades of coloration in the finally dyed product.

Various techniques have been evolved for providing acrylonitrile polymer compositions of improved dyeability. These included copolymerizing acrylonitrile with various monomeric-materials which are intended to lend an enhanced dye-receptivity to the copolymeric product; blending polyacrylonitrile or other acrylonitrile polymers with one or more dye-receptive polymeric materials prior to formation of a fiber product or to the shaped article; and impregnating an already-formed acrylonitrile polymer fiber or other shaped article with a dye-assisting adjuvant or dye-receptive agent, which frequently may be a polymeric material.

The practice of such techniques has not always been completely satisfactory. Neither have the products achieved thereby always provided a completely suitable solution to the problems involved. For example, many of the fiber products which are prepared in accordance with the above-identified techniques known to the art often have inferior physical properties when they are compared with those prepared from unmodified acrylonitrile polymers, particularly polyacrylonitrile. Also, such products, once they have been prepared, may not be as receptive as might be desired to a wide range of dyestuffs, due to inherent limitations in the material capable of been employed for enhancing dye-receptivity. In addition, especially when textile fiber products are involved, treatment or modification of the acrylonitrile polymer article in any of the indicated known ways may not always permit uniform penetration of the dye throughout the cross-section of the fiber. Frequently, the articles which have been modified according to known procedures may exhibit an undesirable tendency to accept a dyestuff only in their peripheral portions. When this phenomenon occurs (which, in connection with fiber products, is ordinarily referred to as ring-dyeing), fibrillation of the fiber, such as normally results from its use, exposes the uncolored interior portions. Such behavior, of course, is undesirable and objectionable in fabrics and other textile materials constructed with fibers of the acrylonitrile polymers.

It would be advantageous, and it is the chief aim and concern of the present invention, to provide acrylonitrile polymers which have been modified with certain graft or block copolymerized substituents so as to be exceptionally dye-receptive while being capable of being fabricated into fibers and the like and related shaped articles having excellent physical properties and other desirable characteristics commensurate with those obtained with the unmodified acrylonitrile polymer substrates, and of the general order obtainable with unmodified polyacrylonitrile. This would possibilitate the manufacture of acrylonitrile polymer based fibers and the like articles having the highly desirable combination of attractive physical characteristics and substantial capacity for and acceptance of dyestuffs.

To the attainment of these and related ends, a dye-receptive polymer composition that is adapted to provide shaped articles having excellent physical properties and characteristics while being simultaneously receptive of and dyeable to deep and level shades of coloration with many of a wide variety of dyestuffs is, according to the present invention, comprised of a fiber-forming graft or block copolymer which is comprised or consists essentially of an acrylonitrile polymer substrate having a minor proportion of substituents graft copolymerized thereto consisting essentially of polymerized sulfonated acrylate and/or acryloyl taurine monomers. Schematically, the compositions may be structurally represented in the following manner:

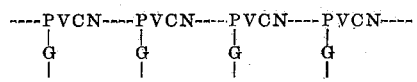

wherein the interlinked "PVCN" symbols represent the acrylonitrile polymer substrate or trunk and the symbols "G" connected thereto the substituent graft copolymers branches of the indicated sulfonated acrylate or acryloyl taurine monomer provided thereon.

As is apparent, the graft copolymer substituent that is combined with the acrylonitrile polymer substrate lends the desired receptivity of and substantivity for various dyestuffs to the compositions while the acrylonitrile polymer trunk substrate that is so modified facilitates and secures the excellent physical properties and characteristics of the various shaped articles, including fibers into which the compositions may be fabricated. Advantageously, as mentioned, the acrylonitrile polymer substrate that is modified by graft copolymerization to provide the compositions of the invention contains in the polymer molecule at least about 80 percent by weight of combined acrylonitrile. More advantageously, the acrylonitrile polymer substrate consists substantially or essentially of polyacrylonitrile.

It is usually beneficial, as has been indicated, for the graft copolymer compositions of the present invention to contain a major proportion of the acrylonitrile polymer trunk or substrate that has been modified with the substituent dye-receptive graft copolymer groups chemically attached thereto. As a general rule, for example, it is desirable for the graft copolymer to be comprised of at least about 80 percent by weight of the acrylonitrile polymer substrate. In many instances, it may be satisfactory for the graft copolymer composition to be comprised of between about 85 and 95 percent by weight of the acrylonitrile polymer substrate, particularly when it is polyacrylonitrile. In this connection, however, better dyeability may generally be achieved when the grafted sulfonated acrylate and/or acryloyl taurine copolymer substituents are prepared under such conditions that they have relatively long chain lengths. Thus, it is usually preferable, when identical quantities of grafted substituent are involved for relatively fewer, but longer chain length grafts to be available than to have a greater number of substituents of relatively shorter chain length.

The sulfonated acrylate and methacrylate monomers and/or acryloyl taurine type monomers which are utilized to modify the acrylonitrile polymer substrates so as to provide the graft copolymer compositions of the present invention may be any of those (or their mixtures) of the structural formulate:

and

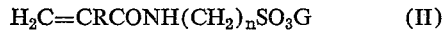

wherein in each formula R is selected from the group consisting of hydrogen or methyl; $n$ (in Formula II) is an integer from 1 to 2; Y is selected from the group of bivalent radicals consisting of methylene radicals, dimethylene radicals (or ethylene), trimethylene radicals, tetramethylene radicals, i.e. radicals of the structure $—(CH_2)_n—$, wherein $n$ is 1–5, methylmethylene radicals (or ethylidene=i.e., $—CH(CH_3)—$), hydroxyethylene (i.e., $—CHCH—CH_2—$) radicals; and G is selected from the group consisting of hydrogen, methyl, ethyl, and alkali metal ions, particularly sodium. Typical of the monomers of this general type that may be employed advantageously in the practice of the present invention are those set forth in the following tabulations:

*Table 1.—Typical sulfoalkylacrylates*

Sulfomethylacrylate
2-sulfoethylacrylate
Sulfomethylmethacrylate, sodium salt
2-sulfoethylmethacrylate, methyl ester
2-sulfoethylmethacrylate, potassium salt
X-sulfopropyl acrylates (wherein X is 2 or 3), as, specifically, 3-sulfopropylacrylate, sodium salt, and sulfoisopropylmethacrylate, methyl ester

*Table 2.—Typical acryloyl taurines*

N-acryloyl taurine
N-acryloyl taurine, sodium salt
N-methacryloyl taurine, methyl ester
N-methacryloyl taurine, potassium salt
N-acryloyl taurine, ethyl ester
N-acryloyl-aminomethane sulfonic acid
N-methacryloyl-aminomethane sulfonic acid, sodium salt
Methyl N-methacryloyl-aminomethane sulfonate As is apparent, the sulfonated acrylate and methacrylate or acrylol taurine monomers may be utilized in the form of their alkali metal salts, particularly sodium salts or as free acids. Advantageously, the monomers of the indicated type that are employed are 2-sulfoethylacrylate and N-acryloyl taurine, sodium salt. If desired, the monomers of the present invention may be utilized in combination or mixture with other varieties of monomers in order to prepare mixed graft copolymers having specific properties and effects, particularly with respect to their capability for accepting greater numbers of diverse types of dyestuffs. For example, the sulfonated acrylate and methacrylate or acryloyl taurine monomers provide graft copolymers showing excellent acceptance of basic dyestuffs. However, other varieties of monomers such as those which may provide basic (alkaline) chemical characteristics in the resulting graft copolymer structure may frequently be used with great advantage to enhance the dye-receptivity of the resulting product to direct or acid types of dyestuffs. Such monomers as vinyl pyridine monomers and aminated vinyl aromatics may frequently be used in a beneficial combination with the sulfonated acrylate and methacrylate monomers contemplated herein.

As mentioned, the graft copolymer compositions of the invention have remarkably good dye-receptivity, particularly in view of their acrylonitrile polymer origin. In most cases, for example, the dye-receptivity of the graft copolymer compositions of the present invention is improved to such an extent in comparison with unmodified acrylonitrile polymers, particularly unmodified polyacrylonitrile, that a color differential of at least about 40 Judd units, as hereinafter illustrated, may readily be obtained between samples of the unmodified acrylonitrile polymer substrate and the graft copolymer compositions of the present invention, each of which have been dyed at a 4 percent dyeing, according to conventional techniques with such a dyestuff as Brilliant Green Crystals (Colour Index Basic Green 1). This is a significant advantage when the compositions are fabricated into shaped article form, especially when they are prepared in a filamentary form suitable for use as a textile material.

The Judd unit is described by D. B. Judd in the "American Journal of Psychology," vol. 53, page 418 (1939). More applicable data appears in "Summary on Available Information on Small Color Difference Formulas," by Dorothy Nickerson, in the "American Dyestuff Reporter," vol. 33, page 252, June 5, 1944. Also see "Interrelation of Color Specifications," by Nickerson, in "The Paper Trade Journal," vol. 125, page 153, for November 6, 1947.

Besides having excellent physical properties and other desirable characteristics, fibers and the like articles comprised of the present compositions similarly have the indicated high capacity for being ready and satisfactorily dyed to deep and level shades of coloration with many dyestuffs. For example, fibers of the present compositions may be easily and successfully dyed according to conventional procedures using vat, acetate, naphthol, and sulfur dyes. Such dyestuffs, in addition to the particular variety mentioned, by way of didactic illustration, as Sulfanthrene Red 3B (Colour Index Vat Violet 2), Amacel Scarlet BS (American Prototype Number 244), Napthol ASMX (Colour Index 35527), Fast Red TRN Salt (Colour Index Azoic Diazo 11), and Immedial Bordeuax G (Colour Index unknown or unestablished) may advantageously be employed for such purposes.

Other dyestuffs, by way of further illustration, that may be utilized beneficially on fiber products of the dye-receptive graft copolymer compositions of the invention include such mordant-acid dyes as Alizarine Light Green GS (Colour Index Acid Green 25) and Brilliant Alizarine Sky Blue BS PAT (Colour Index unknown or unestablished); such basic dyes as Brilliant Green Crystals (Colour Index Basic Green 1), du Pont Methylene Blue ZX (Colour Index unknown or unestablished) and Rhodamine B Extras S (Colour Index Vat Blue 35); such vat dyestuffs as Midland Vat Blue R Powder (Colour Index Vat Blue 35), Sulfanthrene Brown G. Paste (Colour Index Vat Brown 5), Sulfanthrene Black PG Dbl. (Colour Index unknown or unestablished), Sulfanthrene Blue 2B Dbl. paste (Colour Index Vat Blue 5), and Sulfanthrene Red 3B paste (Colour Index Vat Violet 2); Indigosol Green IB Powder (Colour Index unknown or unestablished), a soluble vat dyestuff; such acetate dyes as Celliton Fast Brown 3RA Extra CF (Colour Index Dispersed Orange 5), Celliton Fast Rubine BA CF (Colour Index Dispersed Red 13), Artisil Direct Navy BR (Colour Index unknown or unestablished), Artisil Direct Red 3BP and Celanthrene Red 3BN Conc. (Both Colour Index Dispersed Red 15), Celanthrene Pure Blue BRS 400 percent (Colour Index Dispersed Blue 1), Acetamine Orange 3R conc. (Colour Index unknown or unestablished) and Acetamine Yellow N (Colour Index Dispersed Yellow 32); B-naphthol←2-chloro-4-nitroaniline, an azoic dye; such sulfur dyes as Katigen Brilliant Blue GGS High Conc. (Colour Index Sulf. Blue 9) and Indo Carbon CLGS (Colour Index Sulf. Blue 6); and premetalized dyestuffs including Cibalan Yellow GRL and Supralan Blue NB (both of unknown or unestablished Colour Index); and the like.

The dyed products, especially textile fiber products, are generally lightfast and are well imbued with good resistance to crocking. In addition, dyed textile fiber products comprised of the compositions of the invention exhibit remarkable washfastness, despite repeated exposure and subjection to washing, laundering and dry cleaning treatments. A shaped filamentary article prepared from a dye-receptive composition in accordance with the present invention is schematically illustrated in the sole figure of the hereto annexed drawing.

The dye-receptive graft copolymers of the present invention may be prepared and provided by impregnating the acrylonitrile polymer substrate with the monomeric substance, then polymerizing the monomer in situ in the acrylonitrile polymer substrate. Advantageously, this may be accomplished when the substrate is in the form of an already shaped article, such as a fiber or filamentary structure. Beneficially, the graft copolymerization of the impregnated monomer may be accomplished and facilitated with the assistance of a polymerization catalyst or catalyzing influence which preferentially interacts with the substrate to establish or form a grafting site in order to simultaneously or subsequently initiate the graft copolymerization. As a practical matter, it is generally most desirable to form the graft copolymer compositions in such manner. Most of the free radical generating chemical catalysts, including peroxide and persulfate catalysts, may be utilized for the desired graft copolymerization. It may often be exceptionally advantageous, however, to accomplish the graft copolymerization by subjecting the monomer-impregnated acrylonitrile polymer substrate to a field of high energy radiation in order to efficiently provide an effectively attached graft copolymer of the polymerized monomeric impregnate on the hydrophobic acrylonitrile polymer substrate. Thus, the graft copolymer compositions of the present invention may advantageously be provided in accordance with the general procedure that is described in copending application for United States Letters Patent of George W. Stanton and Teddy G. Traylor having Serial No. 553,701, filed December 19, 1955, disclosing a "Process for Treating Shaped Polymeric Articles to Improve Dyeability."

The monomer may be intimately impregnated in the acrylonitrile polymer substrate in any desired manner prior to the graft copolymerization. Thus, the monomer may be directly applied or it may be applied from dispersion or solution in suitable liquid vehicles until a desired monomer content has been obtained. Ordinarily, it is advantageous for the monomer to be diluted in a solvent or dispersant vehicle so as to provide a treating bath in which to impregnate the acrylonitrile polymer substrate with the latter being immersed in the bath for a sufficient period of time to attain a desired monomer content in the polymer substrate which, as has been mentioned, may be in any fabricated or unfabricated form. Unfabricated graft copolymer compositions in accordance with the present invention may be converted to shaped articles by any desired technique adapted for such purpose with conventional polymers. It is generally desirable and of significant advantage, however, to impregnate a preformed article, such as a textile fiber of the acrylonitrile polymer (or a cloth or fabric comprised thereof) with the monomer in order to prepare the graft copolymer compositions of the invention.

In this connection, particularly when preformed fiber structures are involved, the article may be in any desired state of formation for the impregnating and graft copolymerizing modification. Thus fibers and films may be treated before or after any stretch has been imparted thereto. In addition, they may be in various stages of orientation, or in a gel, swollen or dried condition. It is generally advantageous to prepare the compositions of the invention by impregnating the monomer into the acrylonitrile polymer substrate while the latter is in a water-swollen or hydrated aquagel condition, prior to being finally converted to a dried polymer structure. Such aquagels may be obtained by forming the shaped acrylonitrile polymer articles from the acrylonitrile polymer while it is dissolved in an aqueous saline solution thereof (such as a 60 percent by weight aqueous zinc chloride solution) as by coagulation in a suitable aqueous liquid bath capable of having such effect. When impregnating baths of the monomer are employed, it is generally desirable for them to have a monomer concentration of between about 0.5 and 50 percent by weight and to be prepared as an aqueous solution of the monomer. This is particularly the case when acrylonitrile polymers in an aquagel condition are being impregnated. The impregnation of acrylonitrile polymer fibers and related shaped articles from such a bath may be continued until between about 0.5 and 20 percent by weight of monomer, more or less, based on the weight of the acrylonitrile polymer substrate is incorporated in the substrate. Obviously, unfabricated polymers may be impregnated in an analogous manner. Ordinarily, an impregnating bath having a monomer concentration of between about 5 and 15 percent by weight may advantageously be employed to impregnate the acrylonitrile polymer substrate with monomer in an amount between about 5 and 15 percent by weight of the polymer substrate.

The impregnation and succeeding polymerization may, in general, be effected at temperatures between about 0° C. and about 200° C. for periods of time ranging up to 4 or more hours. The most suitable conditions in each instance may vary according to the nature and quantity of the specific monomeric impregnant involved and the graft copolymerizing technique that is utilized. For example, when chemical catalysts are employed for purposes of forming the graft copolymer, a temperature of between about 50° and 100° C. for a period of time between about 15 and 45 minutes may frequently be advantageously employed for the purpose. Under the influence of high energy radiation, however, it may frequently be of greatest advantage to accomplish the graft copolymerization at temperatures between about 20 and 60° C. utilizing relatively low dose rates and total dosages of the high energy for the desired purpose.

When the graft copolymer compositions are prepared from preformed or already shaped acrylonitrile polymer substrates that are successively impregnated with the monomer, which is then graft copolymerized in situ in the shaped article, excess monomer, if desired, may be squeezed out or removed in any suitable manner prior to effecting the graft copolymerization.

The chemical free radical generating catalysts which may be employed with greatest advantage in the preparation of the graft copolymer compositions of the present invention include hydrogen peroxide, benzoyl peroxide, cumene hydroperoxide, ammonium or potassium persulfate and the like. Such catalysts may be used in conventional quantities to effect the graft copolymerization. When they are utilized, it is of greatest benefit to incorporate them in the impregnating solution of the monomer that is used.

The high energy radiation which may be employed for inducing the graft copolymerization for the preparation of the graft copolymers of the present invention is of the type which provides emitted particles or photons having an intrisinic energy of a magnitude which is greater than the planetary electron binding energies that occur in the graft copolymerizing materials. Such high energy radiation is available from various radioactive substances which provide beta or gamma radiation as, for example, radioactive elements including cobalt-60 and cesium-137, nuclear reaction fission products and the like. If it is preferred, however, high energy radiation from such sources as electron beam generators, including linear accelerators and resonant transformers, X-ray generators and the like may also be utilized. It is beneficial to employ the high energy radiation in a field of at least about 40,000 roentgens per hour intensity. A roentgen, as is commonly understood, is the amount of high energy radiation as may be provided in a radiation field which produces in one cubic centimeter of air at 0° C. and 760 millimeters of absolute mercury pressure, such a degree of conductivity that one electrostatic unit of charge is measured at saturation (when the secondary electrons are fully utilized and the wall effect of the chamber is avoided). It is most desirable, incidentally, to graft copolymerize all or substantially all of the monomeric impregnant to and with the acrylonitrile polymer substrate being modified in order to provide the compositions of the present invention.

For purposes of specifically illustrating, without intending to thereby limit the invention, the following didactic examples are provided wherein, unless otherwise indicated, all parts and percentages are to be taken by weight.

*Example 1*

An oriented polyacrylonitrile aquagel fiber that contained about 1 part of polymer hydrated with about 2 parts of water was soaked for about 15 minutes in a 10 percent aqueous solution of 2-sulfoethyl methacrylate. The wet fiber was then irradiated in the electron beam of a Van de Graaff electrostatic generator operated under a potential of about 2 million electron volts until a total dosage of 10 Mrad was effected. The irradiated yarn was then washed thoroughly with water, dried, heat treated for 5 minutes at 150° C., scoured and then dyed for one hour at the boil in Sevron Brilliant Red 4G (Colour Index Basic Red 14), a basic dye formerly known as Basic Red 4G. A deep red shade of coloration was obtained. In contrast, the unmodified yarn could be dyed to only the faintest degree with the same dyestuff. The graft copolymerized fiber product was also dyed well to deep and level shades of coloration with Amacel Scarlet BS, an acetate type dyestuff (American Prototype No. 244) and with Brilliant Green Crystals. Its reflectance value (as hereinafter defined) upon a 2 percent dyeing in the usual manner with Sevron Brilliant Red 4G was about 14.

The dyeing with Sevron Brilliant Red 4G was performed at the 2 percent level according to the usual procedure at which the fiber sample was maintained for about one hour at the boil in the dyebath which contained the dyestuff in about an amount equal to about 2 percent of the weight of the fiber. The dye-receptivity of the Sevron Brilliant Red 4G-dyed fiber, as indicated by its mentioned reflectance value, was evaluated spectrophotometrically by measuring the amount of monochromatic light having a wave length of about 520 millimicrons from a standard source that was reflected from the dyed sample. The numerical value obtained was taken along an arbitrarily designated scale from 0 to 100. This value represented the relative comparison of the light that was reflected from a standard white tile reflector that had a reflectance value of 316 by extrapolation from the 0 to 100 scale. Lower reflectance values are an indication of better dye-receptivity in the fiber. Ordinarily, unmodified polyacrylonitrile fibers of the same type used for the preparation of the graft copolymerized product generally have a reflectance value of about 120 on the same numerical scale. The improvement in dye-receptivity between the graft copolymerized fiber product of the present invention in comparison with unmodified acrylonitrile polymers was such that a color differential of about 50 Judd units was obtained between the dyed graft copolymer composition and the unmodified acrylonitrile polymer fiber.

*Example 2*

The procedure of Example 1 was repeated excepting to employ 2-sulfoethyl acrylate, sodium salt, as the monomer. Excellent results were likewise obtained. The Sevron Brilliant Red 4G dyed graft copolymerized product had a reflectance value of 13.

Similar results may also be obtained with N-acryloyl taurine, sodium salt.

Results similar to the foregoing may also be obtained when other of the mentioned varieties of monomers of the Formulae I and II are utilized in place of those set forth in the above examples and when graft copolymers are prepared with shaped articles or unfabricated forms of acrylonitrile polymers (including various copolymers) that are treated and irradiated in other than aquagel forms.

What is claimed is:

1. Dye-receptive graft copolymer composition comprised of (1) an acrylonitrile polymer substrate which is a polymer of polymerizable, acrylonitrile-containing, ethylenically unsaturated monomeric material that has in the polymer molecule at least about 80 weight percent of polymerized acrylonitrile, said acrylonitrile polymer having chemically attached to carbon atoms in its chain, as graft copolymerized substituents thereon, a minor proportion of units of (2) a polymerized monomer selected from the group consisting of those of the formulae:

$$H_2C=CR-COO-Y-SO_3G \qquad (I)$$

and

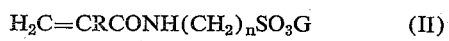

$$H_2C=CRCONH(CH_2)_nSO_3G \qquad (II)$$

wherein R is selected from the group consisting of hydrogen and methyl; n is an integer from 1 to 2; Y is selected from the group of bivalent radicals consisting of methylene radicals, ethylene radicals, trimethylene radicals, tetramethylene radicals, pentamethylene radicals, ethylidene radicals, and hydroxyethylene radicals; and G is selected from the group consisting of hydrogen, methyl, ethyl and alkali metal ions.

2. The composition of claim 1, wherein said acrylonitrile polymer substrate has up to about 20 percent by weight, based on the weight of the composition, of said substituent graft copolymerized units attached thereto.

3. The composition of claim 1, wherein said acrylonitrile polymer substrate has between about 5 and 15 percent by weight, based on the weight of the composition, of said substituent graft copolymerized units attached thereto.

4. The composition of claim 1, wherein said acrylonitrile polymer substrate is polyacrylonitrile.

5. The composition of claim 1, wherein said substituent graft copolymer units are comprised of polymerized 2-sulfoethylacrylate.

6. The composition of claim 1, wherein said substituent graft copolymer units are comprised of a polymerized N-acryloyl taurine.

7. The composition of claim 1, wherein said acrylonitrile polymer substrate is polyacrylonitrile and wherein said substituent graft copolymerized units are present in an amount up to about 20 percent by weight, based on the weight of the composition, and are comprised of polymerized 2-sulfoethylacrylate.

8. A filamentary shaped article comprised of the composition set forth in claim 7.

9. A filamentary shaped article comprised of the composition set forth in claim 1.

10. Method for the preparation of a dye-receptive graft copolymer which comprises polymerizing a minor proportion of a monomer selected from the group consisting of those of the formulae:

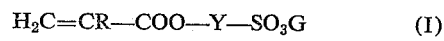

$$H_2C=CR-COO-Y-SO_3G \qquad (I)$$

and

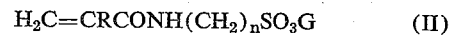

$$H_2C=CRCONH(CH_2)_nSO_3G \qquad (II)$$

wherein R is selected from the group consisting of hydrogen and methyl; n is an integer from 1 to 2; Y is selected from the group of bivalent radicals consisting of methylene radicals, ethylene radicals, trimethylene radicals, tetramethylene radicals, pentamethylene radicals, ethylidene radicals, and hydroxyethylene radicals; and G is selected from the group consisting of hydrogen, methyl, ethyl and alkali metal ions, in the presence of a preformed acrylonitrile polymer which is a polymer of polymerizable, acrylonitrile-containing, ethylenically unsaturated monomeric material that has in the polymer molecule at least about 80 weight percent of polymerized acrylonitrile.

References Cited in the file of this patent

UNITED STATES PATENTS

| | | |
|---|---|---|
| 2,914,499 | Sheetz | Nov. 24, 1959 |
| 2,923,734 | Sheetz | Feb. 2, 1960 |

FOREIGN PATENTS

| | | |
|---|---|---|
| 764,299 | Great Britain | Dec. 28, 1956 |